US008694740B2

(12) United States Patent
Moran et al.

(10) Patent No.: US 8,694,740 B2
(45) Date of Patent: Apr. 8, 2014

(54) AREA EFFICIENT COUNTERS ARRAY SYSTEM AND METHOD FOR UPDATING COUNTERS

(75) Inventors: Gil Moran, Meitar (IL); Adi Katz, Ramat Gan (IL)

(73) Assignee: Freescale Semiconductor, Inc., Austin, TX (US)

( * ) Notice: Subject to any disclaimer, the term of this patent is extended or adjusted under 35 U.S.C. 154(b) by 99 days.

(21) Appl. No.: 13/508,091

(22) PCT Filed: Nov. 6, 2009

(86) PCT No.: PCT/IB2009/054941
§ 371 (c)(1),
(2), (4) Date: May 4, 2012

(87) PCT Pub. No.: WO2011/055168
PCT Pub. Date: May 12, 2011

(65) Prior Publication Data
US 2012/0239902 A1    Sep. 20, 2012

(51) Int. Cl.
*G06F 12/00* (2006.01)
(52) U.S. Cl.
USPC ........................................ 711/155
(58) Field of Classification Search
None
See application file for complete search history.

(56) References Cited

U.S. PATENT DOCUMENTS

| 5,845,126 | A | 12/1998 | Ju et al. |
| 7,293,158 | B2 | 11/2007 | Calvignac et al. |
| 8,134,934 | B2 * | 3/2012 | Chen et al. ............ 370/253 |
| 2002/0138538 | A1 | 9/2002 | Talwar et al. |
| 2005/0166204 | A1 | 7/2005 | Takatsu et al. |
| 2006/0005083 | A1 | 1/2006 | Genden et al. |
| 2007/0189393 | A1 * | 8/2007 | Lee et al. ............ 375/240.25 |
| 2008/0043899 | A1 | 2/2008 | Gara et al. |

OTHER PUBLICATIONS

International Search Report and Written Opinion correlating to PCT/IB2009/054941 dated Jul. 30, 2010.

* cited by examiner

*Primary Examiner* — Hiep Nguyen (57) ABSTRACT

A counters array system comprises a memory device having a plurality of addressable memory locations for storing counter-values; a plurality of delta-counter devices. Each delta-counter device is operable to hold a maximum delta-value corresponding to a maximum number of occurrences of an event during a time duration between two counter scans controlled by a scan control unit. Each delta-counter device has an input connected to receive a signal from an event source corresponding to an occurrence of the event, and an output connected to provide a delta-value representing an accumulated number of occurrences of the event to a delta-count update circuit. The delta-count update circuit is connected to the memory device and the counter scan control unit, and being arranged to receive the delta-value and an address of a corresponding counter-value, read the counter-value from the memory device, and provide an updated counter-value incremented by the delta-value to the memory device.

20 Claims, 3 Drawing Sheets

FIG. 3

AREA EFFICIENT COUNTERS ARRAY SYSTEM AND METHOD FOR UPDATING COUNTERS

FIELD OF THE INVENTION

This invention in general relates to counters and more specifically to a counters array system, a method for updating counters in a counters array system, and a processing device.

BACKGROUND OF THE INVENTION

Computer systems using single or multiprocessor architectures often include on a chip a set of counters allowing for counting processor events and system events. Statistic counters or performance measurement or monitor counters are used for counting for example floating point operations or cache misses, just to name a few countable events indicative of system performance. Event statistics for example help monitor an application and analyze its performance. Statistics may be easily acquired in hardware and may provide a feedback mechanism for application tuning, even on highly parallel systems.

Distributed network systems for example interconnecting computers, contain communication processors dedicated for example to packet classification and modification, packet forwarding or queuing policy management. Events indicative for system performance are for example packet retransmission rates, queue overflow etc.

For high-performance systems, many event counters are required and are often implemented, at the cost of high power consumption and increased die area and production cost, using fast data flip-flops (DFF) receiving the clock signal, allowing all counters to count at full clock-speed, probably in parallel, while low-performance systems may contain inexpensive random access memory (RAM) devices for storing counter values. Performance measurement counters typically count at full clock rate, and are therefore usually implemented as purely DFF based counters.

In US 2008/0043899 A1, a hybrid counters array is presented, wherein an array of counters is dedicated to hold the least significant (LS) bits (or binary digits) of binary representations of performance counter values while RAMs such as dynamic RAMs (DRAMs) are dedicated to hold the most significant (MS) bits. The used RAM may require initialization. In the shown system, counters are re-set in a reset sequence. Counters can start counting together after completion of the sequence. The shown system increments LS-bits counters and calculates roll-over bits for triggering incrementation of MS bits stored in the RAM.

In U.S. Pat. No. 7,293,158 B2, a system for implementing counters in a network processor is shown. The system uses an inexpensive, slow dynamic RAM (DRAM) coupled to a register pipeline capable of handling one event at a time. A counter controller may increment counter values more than once during a read-modify-write cycle initiated for the counter.

SUMMARY OF THE INVENTION

The present invention provides a counters array system, a method for updating counters in a counters array system, and a processing device as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
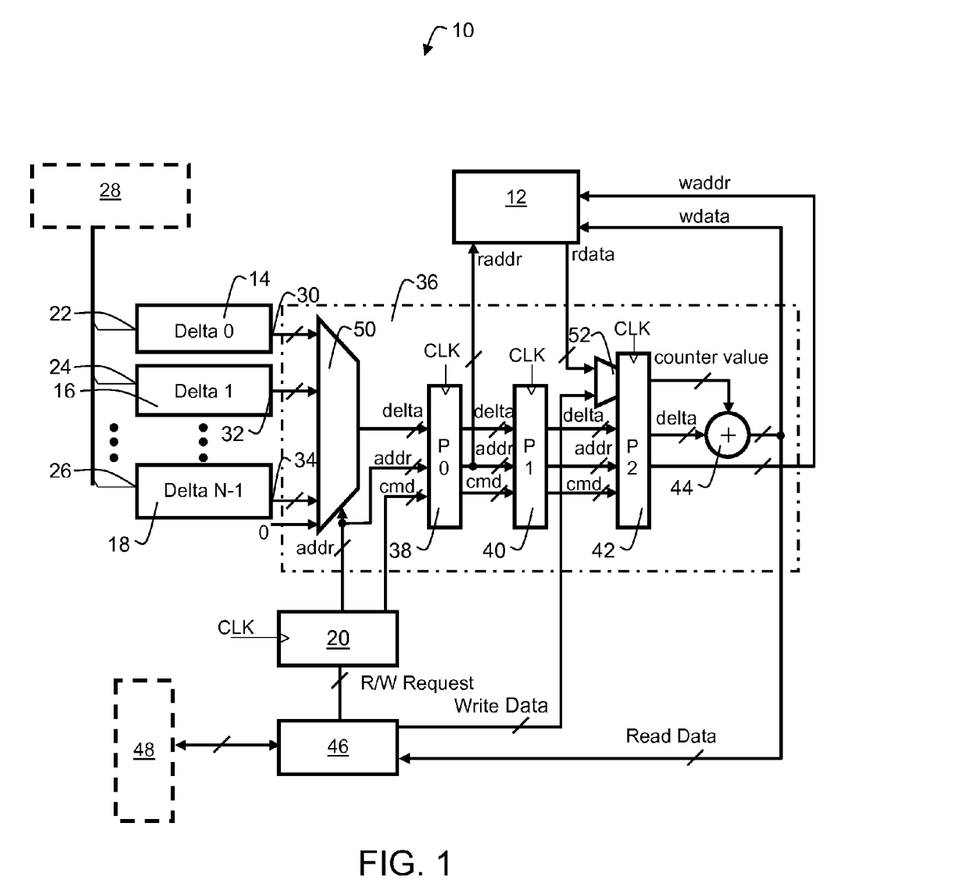
FIG. 1 schematically shows an example of an embodiment of a counters array system.

Referring to FIG. 1, an example of an embodiment of a counters array system is shown. The counters array system, CNT, 10 may comprise a memory device 12 having a plurality of addressable memory locations for storing counter-values; a plurality of delta-counter devices 14, 16, 18, each operable to hold a maximum delta-value corresponding to a maximum number of occurrences of an event during a time duration between two counter scans controlled by a scan control unit 20. The delta-counter devices 14, 16, 18, each have an input 22, 24, 26 connected to receive a signal from an event source 28 corresponding to an occurrence of the event, and an output 30, 32, 34 connected to provide a delta-value representing an accumulated number of occurrences of the event to a delta-count update circuit 36. The delta-count update circuit 36 is connected to the memory device 12 and the counter scan control unit 20. The delta-count update circuit 36 is arranged to receive the delta-value and an address of a corresponding counter-value, to read the counter-value from the memory device, and to provide an updated counter-value incremented by the delta-value to the memory device.

The counters array system 10 may store counter-values representing event occurrences in the memory device 12. The counter-values may represent a number of occurrences of events, for example in a processing device such as a multi-core or single-core processor and counters may serve as statistics counters or performance monitor counters.

Stored counter-values may be updated by the delta-count update circuit 36 which may, controlled by the scan control unit 20, receive delta-values, that is numbers of occurrences of particular events since a previous counter-value update, from the plurality of delta-counters. The scan control unit 20 may request delta-counter value check of delta-counters corresponding to respective counter-values stored in the memory device identified by their address addr. The scan control unit 20 may control a multiplexing circuitry 50 for checking delta-counter values.

Systems using large numbers of wide event counters (for example 32-bit, 64-bit counters), either for statistic or performance measurement, typically count at full clock rate, and may therefore typically be implemented using circuitry purely based on fast data flip-flop (DFF) circuits which may be expensive concerning die area and static and dynamic power consumption. The shown system 10 may allow sustained full clock rate count of the counters while using a comparably low performance memory device 12 for storing counter-values. The system may be arranged to allow all counters to count in parallel at full clock (CLK) speed, even if the chosen memory device 12 hardware is not optimized for updating all counter-values at a time at full CLK speed. The shown system may be implemented with equivalent or at least similar performance compared to a pure DFF implementation using only the required number of least significant bits of the counter-values to accumulate delta-values of each counter between scan events, and having a memory device for storing the full counter-values. The memory device may hold the full counter-value thereby saving configuration read bus multiplexer (MUX) area, because with large number of counters extra memory width may be more efficient than an implementation requiring a large MUX logic circuit area. The presented system may also reduce static and dynamic power consumption compared to a completely DFF based implementation.

The scan control unit 20 may check delta-values, that is the current value hold by a delta-counter, between scan events, i.e. during a scan period. The scan period may depend on the time required for checking each of the plurality of delta-counters and may for example depend on a refresh cycle of the memory device. A maximum possible number of occurrences of an event during a scan period, that is the time duration between two counter scans, may determine the minimum width of the particular delta-counter. And delta-counter width may for example be auto-calculated according to number of counters to avoid overrun when all counter count in parallel at full clock rate and concurrent with configuration bus accesses. Delta-counter width and configuration bus access rate limits may be automatically calculated parameters which may enable concurrent count at full clock on all counters combined with full rate configuration read/write access requests, and without risk of delta counter overruns.

The number of detected event occurrences may also depend on the clock (CLK) rate of the system. In order to reduce power consumption and die area, delta-counters may be implemented having a width or a number of digits for storing a delta-counter value of not more than the width required for holding the maximum number of events during the scan period. Therefore, the digits of the delta-values hold by the delta-counters may represent the addition for the full counter-values stored in the memory device.

One or more of the plurality of delta-counter devices may be operable to hold a validity parameter arranged to indicate a validity of their corresponding counter-value. The validity of a corresponding counter-value, that is its associated memory address content, may indicate, if the memory content for holding the counter-value is non-initialized (in which case it may implicitly be assumed to be zero) or initialized (in which case it may hold a value written in the past). Here delta-counter width may be chosen wider, for example one bit more for holding a validity bit as a parameter whether a previous delta-counter value may have been pushed to the delta-count update circuit 36, therefore being indicative whether the corresponding counter-value in the memory 12 not being initialized. A validity bit may for example not been set when the delta-count update circuit did not yet receive a valid delta-counter value from a delta-counter.

As shown in FIG. 1, the delta-count update circuit 36 may comprise a register pipeline having a plurality of stages 38, 40, 42, configured to receive in a first stage 38 the delta-value and the address of the corresponding counter-value and to issue the address to the memory device 12 and to receive in a later stage 42 the corresponding counter-value from the memory device 12 and provide the counter-value and the delta-value to an accumulating circuit 44. The shown accumulating circuit 44 may receive the counter-value and corresponding delta value and provide an updated counter-value wdata to memory location waddr of the memory device 12.

The shown pipeline implementation may comprise three stages. When the scan control unit performing scan cycles, that is polling delta-counters 14, 16, 18 for their current delta-value, reaches a counter address addr, it may check whether the corresponding delta-value has crossed a calculated threshold.

The scan control unit 20, which may for example be implemented as a state machine, may therefore be arranged to periodically check delta-values of the plurality of delta-counter devices and to initiate pushing a delta-value to the delta-count update circuit 36 and clearing the corresponding delta-counter device 14, 16, 18 when the delta-value is outside a calculated range. The delta-value may be outside the range when the value is above a threshold. However, depending on the chosen counter implementations the range may be given by a lower limit instead or in addition to the upper limit.

If the threshold is crossed, the corresponding delta-value may get pushed to the first pipeline stage P0 38 and the respective delta-counter may get cleared and, if applicable, its validity bit get set. Using of a minimal threshold value between counts before the delta-counter value may be eligible for updating the corresponding counter-value in memory device 12 may help achieve power saving. And the threshold may assure that the delta-counter does not overflow until the scan logic unit 20 selects it again. A delta-counter may for example be eligible to service or selected to push its value into the delta-count update circuit when it is non zero and above for example ¼ of full range count (i.e. two MS bits or not 2'b00, that is the two most significant bits of a delta-counter are not zero). A bandwidth calculation may take into account that a delta-counter may for example not count more than ¾ of its full range together with concurrent configuration bus accesses until the scan logic unit addresses it again.

The scan control unit 20 may be arranged to issue a dummy read zero command when the delta-value pushed to the delta-count update circuit indicates the corresponding counter-value being non-initialized. The delta value may comprise the validity parameter arranged to indicate said counter-value state. In other embodiments, the delta value may for example comprise a validity information or initialization information encoded differently within the value of the delta-counter. On reception of the dummy read zero command the delta-count update circuit may be adapted not to access the memory device for reading the counter-value but to use a dummy zero counter-value instead. This may avoid reading of a non-initialized counter-value and hence allow for a warm reset (soft reset) of counters, which may reset one or more delta-counters and associated validity parameters within a single clock cycle and without accessing the memory device 12 while not affecting other delta-counters being defined to be cleared only by hard reset. This behaviour may be regarded equal to a behaviour of a purely register-based implementation of a counters array system. In stage P0 38, if validity bits are used and the previous counter validity bit is zero, i.e. not set, hence indicating a memory address in the memory device 12 not being initialized, no read request may be send to the memory device and the dummy read zero command cmd may be pushed to stage P1 40. The dummy read may not really access the memory device and may implicitly return zero counter-value to stage P2 42. Otherwise a read request raddr with the corresponding counter address may be generated and send to the memory device 12 and a "read memory data" command cmd may be pushed to stage P1 40. Memory access for reading issued in stage P0 38 may usually have lower priority than a stage P2 42 write-back access explained below.

It should be noted that any implementation using a "pull" mechanism instead of "push" is still within the scope of the presented system.

In stage P1 40, a selection may be performed whether to push "memory read data" or zero data ("dummy read zero") to stage P2 42.

In stage P2 42, the addressed counter-value rdata may be read from the memory device 12, sent with the delta-value delta provided by stage P1 40 to the accumulator circuit 44 and the updated counter-value or zero may be written back to the memory device 12.

The delta-count update circuit may be arranged to trigger clearing the delta-counter corresponding to the updated counter-value when accessing the memory device 12 for writing the updated counter-value. This may allow events accumulated during the same or next clock cycles not to be missed while the updated value is being written to the memory device 12. With the shown pipeline structure, a counter may get increment control at the same time it is read by the scan logic unit 20 or by a configuration access unit 46 without missing a count at the concurrent event.

In case of a concurrent event signal assertion during a write or read or configuration operation that clears the delta-counter, the delta-counter may be cleared to value of 1 instead of 0. This may avoid missing to count the concurrent event signal.

The delta-counter devices 14, 16, 18 may be bistable multivibrators, such as flip-flop circuits, for example clocked data flip-flops (DFF). This may allow for delta-counting events at full clock speed, even with a large number of delta-counters counting different events in parallel.

The described counters array system 10 may allow for the memory device 12 to be a random access memory device (RAM). Although access to the RAM may be slow compared to DFF access, RAM may be suitable in terms of low price, power consumption and required area.

A RAM may be any type of RAM, such as a static RAM (SRAM) or dynamic RAM (DRAM). However, a read-modify-write access to the memory may be slow compared to a DFF based implementation.

And the memory device 12 may be a single port device, for example a single-port RAM. The memory device may be a probably more expensive dual port RAM allowing for two sided read and write access or any other memory device. The delta-count update circuit, for example implemented using a pipeline, may allow for continuous clocked read-modify-write access to the memory device with only a few clock cycles (one or two in the shown example) delay.

In an embodiment of the counters array system, the system 10 may comprise a configuration access logic unit 46 connected to the scan control unit 20 and the delta-count update circuit 36, arranged to switch the delta-count update circuit 36 into a configuration mode. In configuration mode, delta-value update may be enforced and counter-values may be read or written bypassing the scan control unit 20 and independently of delta-counter states and current counter-values. The configuration access logic unit 46 may be connected to a configuration bus 48, may receive configuration data and may provide read access for updated counter-values to other devices connected to the configuration bus 48. Communication bus commands may have priority in the delta-count update circuit over counter scan control commands.

The configuration access logic unit 46 may be arranged to trigger delta value update of the counter-value and read the updated counter-value ("Read Data") independently of the counter-scans of the scan control unit 20. The delta-count update circuit 36 may be used for reading an updated counter-value while the counter scan control unit 20 may be bypassed and an update of the particular delta-counter may be enforced, that is the delta-value may be pushed from the delta-counter to the delta-count update circuit independently of its current value and the updated counter-value wdata written back from the delta-count update circuit 36 to the memory device 12 may be read by the configuration access logic unit 46. In the case of a 3 stage pipelined implementation as shown in FIG. 1, stage P2 42 write back may be snooped back as configuration bus Read Data. Snooping back the write data to the memory device as the configuration read result may help achieve read area optimization. The shown system may also help avoiding redundant multiplexer (MUX) logic from the delta counters and reusing existing MUX logic dedicated to updating the counter-values to the memory device.

And the configuration access logic unit 46 may be arranged to clear the updated counter-value after reading, implementing a read-and-clear operation by writing back zeros after reading an updated counter-value, avoiding dedicated initialization periods of the memory device 12. It may be implemented as a read operation except that the write-back value wdata for memory location waddr provided to the memory device 12 is bypassed by all zeros. This functionality may for example be selected by an input signal or configuration bit. It may be applied either globally to all counters or per counter. Counts beyond the read-and-clear operation may be accumulated by the corresponding delta-counter in parallel to memory update. The read-and-clear access operation may be carried out within one memory device read access and one clock pipeline latency, like a regular read/write access.

In an embodiment of the system, a second configuration access may not be accepted until the previous configuration access is complete. There may be essentially no degradation on configuration bus access rate except for one or two wait state clock cycles for pipeline propagation when using a pipeline implementation of the delta-count update circuit 36 as shown.

And the configuration access logic unit 46 may be arranged to write a configuration counter-value to the delta-count update circuit 36 independently of the counter-value provided by the memory device 12. Here the scan control unit 20 may be bypassed to enforce update of the delta counter. When using a pipeline implementation for delta-count update circuit 36, stage P0 38 may be configured to bypass memory access and push a dummy read zero command and zero delta-counter value to stage P2 42 without the dummy command accessing the memory device. Stage P2 42 may use multiplexer 52 and get zero delta-counter and Write Data from configuration access logic unit 46 as counter-value and therefore its may write back the "Write Data" value to the memory device 12. Counts beyond the written value may be accumulated in parallel by the corresponding delta counter.

The memory device 12 may for example be a zero wait state single port RAM device. It may need two accesses for a single counter update, and these accesses may not be back to back in a read-modify-write sequence. Therefore, the shown pipeline implementation may be configured to identify a situation the same counter value being triggered by both the scan logic unit 20 and a configuration read access issued by the configuration access logic unit 46. This case may be detected when P0 pipeline stage 38 already holds the same value that needs to be pushed in. In that case the push to P0 stage 38 may be delayed by a clock cycle.

The described configuration bus access mechanism may ensure not to load the system and may avoid count misses on one hand and minimize counters scan penalty to one clock cycle on the other hand when using a system as described, hence allowing for a low read/write/clear counter access latency. The shown implementation for memory device updates which allows for configuration bus accesses may assure equivalent or at least similar behavior compared to a register based implementation except for one or two additional wait states for the configuration bus access and may avoid large multiplexer logic circuitry for implementing configuration bus read access.

The presented system may be used for counters of any width. Wide counters systems may especially benefit from the shown approach, since a percentage of digits to be implemented as fast delta-counters may be low. Therefore, in an embodiment of the system counter-values may be 32 bits wide or 64 bits wide. For example, a system holding 247 32-bit counters may allow for a reduction of required die area of about 40%. As another example, implementing more than 1000 64-bit counters may result in about 80% area reduction. Counters may be even wider, which may even more help increase relative saving of die area.

The shown counters array system 10 may allow for reset of the system. In the shown system a reset may be carried out within a single clock cycle. On soft reset all delta-counters may be cleared. This may comprise synchronous clear of the delta-counters. In an embodiment where the delta-counters also comprise a validity parameter, on soft reset also their validity bits may be cleared. The delta-counter devices 14, 16, 18 may be configured to clear or protect their delta-value depending on a parameter. That is, on soft reset for example only delta-counters defined as soft reset may be cleared. This may comprise clearance of their validity parameter, if applicable. The scan control unit may be configured to apply a soft-reset to the plurality of delta-counter devices depending on a parameter configurable for each delta-counter allowing for clearance or for protecting a current value of the counter on reception of a soft reset signal. Hence, delta-counters may all or selectively be reset on reception of the soft reset signal.

Clearing validity bits of delta-counter devices may eliminate a need to initialize the corresponding counter-values in the memory device 12 and may allow for soft reset of counters within a single clock cycle.

In an embodiment of the system, during a soft reset, the scan logic unit 20 may be configurable to mask memory input to protect counter-values. This may for example be helpful when a soft reset may cause an asynchronous count enable toggle.

On hard reset, counter-values may be reset. On hard reset, delta-counters and validity parameters, the delta-count update circuit 36 and the configuration access logic 46 may be reset. Soft and hard reset may both not need to initialize the memory device 12 and may be carried out within a single clock cycle. Depending on the implementation of the system circuitry, reset may be carried out within a few clock cycles.

Figure 2:
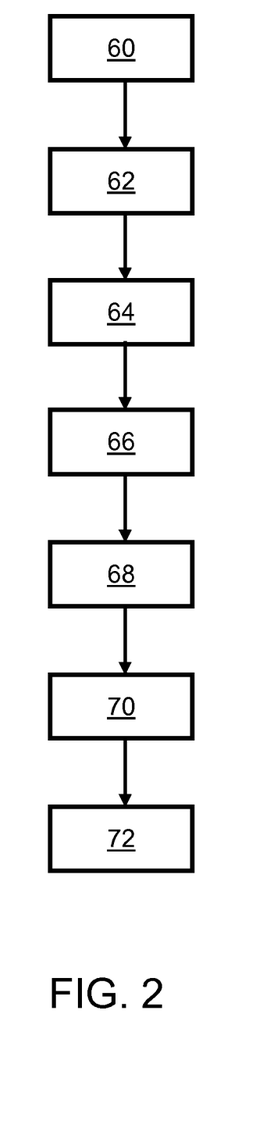
FIG. 2 schematically shows an example of an embodiment of a method for updating counters in a counters array system.

Referring now to FIG. 2, an example of an embodiment of a method for updating counters in a counters array system is shown. The illustrated method allows implementing the advantages and characteristics of the described counters array system as part of a method for updating counters in a counters array system.

The method for updating counters in a counters array system may comprise applying 60 each of a plurality of signals to a corresponding one of the delta-counter devices, each signal from an event source corresponding to an occurrence of an event, a delta-counter width for each of a plurality of delta-counter devices depending on a maximum occurrence rate of the event during a time between two counter scans; each of the plurality of delta-counter devices providing 62 a delta-value representing an accumulated number of occurrences of the event to a delta-count update circuit; triggered 64 by a scan control unit, providing 66 an address of a corresponding counter-value stored in a memory device to the delta-count update circuit; reading 68 the counter-value from the memory device; incrementing 70 the counter-value by the delta-value; and providing 72 an updated counter-value to the memory device.

In an embodiment of the method, the step of triggering 64 by the scan control unit may comprise periodically checking delta-values of the plurality of delta-counter devices and initiating pushing the delta-value to the delta-count update circuit and clearing the corresponding delta-counter device when the delta-value is outside a calculated range.

It should be noted that it is within the scope of the described system and method that incrementing a counter-value may comprise decrementing the value or applying any other operation which changes the counter-value with respect to occurrences of events to be counted, depending on the chosen implementation.

Figure 3:
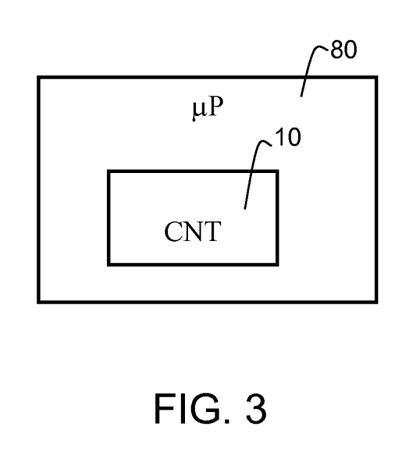
FIG. 3 schematically shows an example of an embodiment of a processing device.

Referring now also to FIG. 3, an example of an embodiment of a processing device is shown. The processing device 80 may comprise a counters array system 10 as described above. The processing device 80 may be any device using a system with for example large numbers of statistics or performance counters, for example a system where register-like behaviour of the counters system may be useful, for example selective one-clock soft reset. The processing device 80 may for example be any type of multi-core or single-core processor, a general purpose processor (GPP), a central processing unit (CPU), a graphics processing unit (GPU), a microcontroller unit (MCU) or communications processor such as for example Freescale's QorIQ P4080 Communications Processor. Any processing device being operably connected to a counter-array system may be considered to be within the scope of a processing device comprising the counter-array system.

And in an embodiment of the processing device, it may comprise a computer program product comprising code portions for executing steps of a method as described above.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connections that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the memory device 12 may be a single device or may be implemented as a plurality of memory devices.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the counters array system 10 may be implemented as part of the processing device 80. Alternatively, the examples may be implemented as any number of separate integrated circuits or separate devices interconnected with each other in a suitable manner. For example, the memory device 12 of the counters array system 10 may be implemented as a separate integrated circuit.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While the principles of the invention have been described above in connection with specific apparatus, it is to be clearly understood that this description is made only by way of example and not as a limitation on the scope of the invention.

The invention claimed is:

1. A counters array system, comprising
a memory device having a plurality of addressable memory locations for storing counter-values; and
a plurality of delta-counter devices, each operable to hold a maximum delta-value corresponding to a maximum number of occurrences of an event during a time duration between two counter scans controlled by a scan control unit, and each of said plurality of delta-counter devices comprises
an input connected to receive a signal from an event source corresponding to an occurrence of said event, and
an output connected to provide a delta-value representing an accumulated number of occurrences of said event to a delta-count update circuit, wherein
said delta-count update circuit is coupled to said memory device and said scan control unit, and
said delta-count update circuit is configured to
receive said delta-value and address of a corresponding counter-value,
read said counter-value from said memory device, and
provide an updated counter-value incremented by said delta-value to said memory device.

2. The counters array system as claimed in claim 1 wherein one or more of said plurality of delta-counter devices are operable to hold a validity parameter arranged to indicate a validity of their said corresponding counter-value.

3. The counters array system as claimed in claim 1 wherein said delta-count update circuit comprises:
a register pipeline having a plurality of stages configured to
receive in a first stage said delta-value and address of said corresponding counter-value,
issue said address to said memory device,
receive in a later stage said corresponding counter-value from said memory device, and
provide said counter-value and said delta-value to an accumulating circuit.

4. The counters array system as claimed in claim 1 wherein said scan control unit is configured to:
periodically check delta-values of said plurality of delta-counter devices, and
initiate pushing said delta-value to said delta-count update circuit, and
clear a corresponding delta-counter device when said delta-value is outside a calculated range.

5. The counters array system as claimed in claim 4 wherein said scan control unit is further configured to issue a dummy read zero command when said delta-value pushed to said delta-count update circuit indicates said corresponding counter-value is non-initialized.

6. The counters array system as claimed in claim 1 wherein said delta-count update circuit is further configured to trigger clearing a delta-counter device corresponding to said updated counter-value when accessing the memory device for writing said updated counter-value.

7. The counters array system as claimed in claim 1 wherein said plurality of delta-counter devices are bistable multivibrators.

8. The counters array system as claimed in claim 1 wherein said memory device is a random access memory device.

9. The counters array system as claimed in claim 1 wherein said memory device is a single port device.

10. The counters array system as claimed in claim 1 further comprising:
a configuration access logic unit, connected to said scan control unit and said delta-count update circuit, and configured to switch said delta-count update circuit into a configuration mode.

11. The counters array system as claimed in claim 10 wherein said configuration access logic unit is further configured to:
trigger a delta-value update of said counter-value, and
read said updated counter-value independently of said counter scans of said scan control unit.

12. The counters array system as claimed in claim 11 wherein said configuration access logic unit is arranged to clear said updated counter-value after reading.

13. The counters array system as claimed in claim 10 wherein said configuration access logic unit is arranged to write a configuration counter-value to said delta-count update circuit independently of said counter-value provided by said memory device.

14. The counters array system as claimed in claim 1 wherein one or more of said plurality of delta-counter devices are configured to clear or protect their said delta-value depending on a parameter.

15. A method comprising:
applying each of a plurality of signals to a corresponding one of a plurality of delta-counter devices, wherein
each signal is from an event source corresponding to an occurrence of an event,
a delta-counter width for each of the plurality of delta-counter devices depends on a maximum occurrence rate of said event during a time between two counter scans;
providing, by each of said plurality of delta-counter devices, a delta-value representing an accumulated number of occurrences of said event to a delta-count update circuit;
providing an address of a corresponding counter-value stored in a memory device to said delta-count update circuit, wherein said providing the address is triggered by a scan control unit;
reading said counter-value from said memory device;
incrementing said counter-value by said delta-value; and
providing an updated counter-value to said memory device.

16. The method as claimed in claim 15, wherein triggering by said scan control unit comprises:
periodically checking delta-values of said plurality of delta-counter devices;

initiating pushing said delta-value to said delta-count update circuit; and clearing a corresponding delta-counter device when said delta-value is outside a calculated range.

17. A processing device, comprising said counters array system as claimed in claim 1.

18. The method as claimed in claim 15 further comprising:

clearing a delta-counter device corresponding to said updated counter-value when performing said providing the updated counter-value to said memory device, wherein said clearing is triggered by said delta-count update circuit.

19. The method as claimed in claim 15 further comprising:

switching said delta-count update circuit into a configuration mode.

20. The method as claimed in claim 19 further comprising:

triggering a delta-value update of said counter-value; and reading said updated counter-value independently of said counter scans of said scan control unit.

* * * * *